United States Patent Office 3,387,993

Patented June 11, 1968

3,387,993

MAGNETIC TAPE WITH A LUBRICANT CONTAINING MINERAL OIL AND FATTY ACID AMIDE IN THE MAGNETIC COATING

Dervin L. Flowers, Redwood City, Calif., assignor to Ampex Corporation, Redwood City, Calif., a corporation of California No Drawing. Filed Oct. 16, 1964, Ser. No. 404,495
3 Claims. (Cl. 117—121)

ABSTRACT OF THE DISCLOSURE

A magnetic recording medium of the type wherein magnetic particles are dispersed in a resin and coated on a suitable base wherein the coating contains a lubricant consisting essentially of from 0.2 to 3% of a mineral lubricating oil and from 1 to 5% of a higher fatty acid amide.

This invention relates to a magnetic recording medium having a lubricant incorporated therein. More specifically, the invention relates to an improved magnetic recording medium wherein a backing material which may be in the form of a tape, belt, disk, or the like, is provided with a synthetic resin binder and lubricant having finely divided magnetic particles dispersed therein. Normally, the backing material is plastic, although other materials such as paper, glass or metal can be used.

The invention is particularly applicable to video tape recording, but it will be obvious in the description which follows that the invention is applicable to any magnetic recording system.

In video tape recording and reproducing, the head ordinarily moves from side to side of the tape, either at a slight angle normal to the tape travel, as when each pass of the head is used to record only a few lines of the frame, or the movement of the head can be almost parallel to the sides of the tape in the so-called spiral or helical scan wherein each pass of the head represents an entire frame of the picture. The latter system is quite commonly used in closed circuit television systems, particularly for educational purposes. Such machines frequently incorporate a "still frame" operation wherein the tape is stopped and the head continues to move, so that a single still frame is continuously projected. It is obvious that when the reproducer is in the still frame position, a small portion of the tape is subjected in a few minutes to the equivalent wear of thousands of normal playbacks of the tape. Magnetic recording tapes which have heretofore been available have a useful still frame life of less than five minutes. In accordance with the present invention, it is possible to manufacture tapes having a useful still frame life of forty minutes and longer.

Although lubricants for incorporation in the resin system have heretofore been proposed for magnetic tapes, they have not been fully satisfactory. As is mentioned above, even the best of the lubricants heretofore available has resulted in only a short still frame life. Further, other lubricants have been proposed which, although they may increase the still frame life, detract from the long-term storage stability of the tape so that the tape rapidly loses its still frame life when not in use, particularly if stored under conditions of high temperature and humidity.

It is therefore an object of the present invention to provide a lubricated tape which has a long still frame life.

Another object of this invention is to provide a lubricant for tapes which is compatible with all of the resin systems which are employed in the manufacture of magnetic tapes.

Still another object of this invention is to provide a lubricant for a magnetic tape wherein the lubricant does not cause a deterioration of the shelf life of the tape.

Other objects and features of the invention will be apparent from the balance of the specification.

In general, the objects of the present invention are achieved by incorporating in the tape coating from 0.2 to 3% of a mineral lubricating oil and from 1 to 5% of a fatty acid amide, said percentages being based on the amount of resin solids and magnetic particles in the tape coating. Neither of these lubricants alone is capable of yielding a tape having a satisfactory still frame life.

Suitable mineral oils include uncompounded hydrocarbon oils having a viscosity of from 10 to 1000 cs. at 100° F. Typical suitable oils are those sold by the Shell Oil Company under the designation ET–250–N, which has a viscosity at 100° F. of 25 cs. and at 210° F. of 4.6 cs.; ET–100–N which has a viscosity at 100° F. of 18 cs. and at 210° F. of 3.8; and WTE–150–BS which has a viscosity at 100° F. of 510 cs.

Suitable fatty acid amides include those amides corresponding to saturated or unsaturated fatty acids having from 6 to 18 carbon atoms. A suitable fatty acid amide is commercially available under the name of Armid HT and consists of a mixture in approximately 25 parts of myristamide and 75 parts of stearamide. Other suitable amides include: caproic, caprylic, lauric, palmitic and mixtures thereof as well as myristic and stearic amides alone or in proportions other than those set forth above.

Various binders can be used with the lubricant of the present invention. Polyurethane resins are particularly suitable, such as those sold under the trade name Estane, which are made by reacting p,p'-diphenylmethane diisocyanate, adipic acid and butanediol-1,4 to produce a substantially unreactive polymer. Estane resins X–1 and X–2 have a hardness (durometer A) of 88 and 65, respectively. Other suitable resins are the copolymers of vinylidene chloride and acrylonitrile such as those sold under the trade name Saran. One typical resin is Saran F–220 which consists of copolymerized vinylidene chloride and acrylonitrile in an 80:20 ratio and having a specific gravity of about 1.6. Other suitable resins include the epoxy resins and particularly that family of high molecular weight epoxy resins commonly called phenoxy resins. Other suitable binders include vinyl chloride-vinyl acetate copolymers, cellulose actate, vinyl acetate, cellulose nitrate, methyl cellulose, and acrylonitrile rubbers such as acrylonitrile-butadiene copolymers and acrylonitrile-butadiene-styrene copolymers. Mixtures of various resins can be advantageously employed as is shown in the examples.

The present invention may be employed with coatings which are applied to a wide variety of backing materials, such as paper, glass or metal, but it is particularly advantageous when the coatings are applied to a plastic backing material such as cellulose acetate, Mylar (polyethylene terephthalate), polypropylene, and the like.

In many instances, it is desirable to incorporate additions into the tape other than the resin binder, lubricant and the magnetic oxide particles, as is well known to those skilled in the art. Thus, anti-static compounds such as carbon black might be added, fungicides such as phenyl mercuric oleate, dispersants such as sodium sulfosuccinate and anti-oxidants such as hydroquinone.

The following non-limiting working examples typify the invention:

*Example 1.*—A slurry grind is prepared in a five-quart ball mill half filled with ½" flint pebbles. The preparation consists of 850 grams of gamma ferric oxide of 0.5 micron average particle size, 178 grams of toluene, 413 grams of methyl ethyl ketone, 4.25 grams of hydroquinone (anti-oxidant), 25.5 grams of sodium sulfosuccinate and 42.5 grams of conductive carbon black. This mixture is then rotated for 72 hours to achieve dispersion. A resin grind is then prepared as follows: To the slurry grind prepared above is added a solution containing 210 grams of polyurethane polymer (Estane X–1), 420 grams of tetrahydrofuran and 769 grams of methyl ethyl ketone. To this mixture is then added the lubricant of the present invention. This is a mixture consisting of 17 grams of Armid HT and 8.5 grams of East Texas 250 neutral oil (Shell Oil Company 250–ETN). This final mixture consisting of the resin grind is then milled for 24 hours after which time it is drained from the mill, filtered through a 3 micron filter, and coated on a suitable base film to produce a magnetic tape. The viscosity of the mixture is on the order of 3,000 centipoises.

This mixture is coated on one mil Mylar (polyethylene terephthalate) and dried at 200° F. for several minutes; the finished tape had an 81% by weight oxide load based on total oxide plus resin solids and the coating is 0.4 mil thick. The resulting tape "still frames" on the Ampex VR–1500 (a spiral scan video reproducer) for 40 minutes in contrast to most available commercial tapes that "still frame" for about 5 minutes or less. These tapes also do not suffer from age deterioration since even after 72 hours in an environmental chamber at 130° F. and 85% relative humidity or two months storage at room conditions of approximately 75° F. and 15% relative humidity, no change is observed in "still frame" time or output on the Ampex VR–1500.

*Example 2.*—The same procedure was followed as Example 1 but with 162 grams of Estane X–1 instead of 210 grams and coated on a cellulose triacetate base rather than Mylar and the oil was 3% ET–100–N.

*Example 3.*—The same procedure as Example 1 but with 210 grams of an 80/20 vinylidene chloride/acrylonitrile copolymer as the polymeric binder, i.e., Saran F–220 instead of Estane X–1, and the coating was applied to a polypropylene base. The lubricating oil was 0.2% WTE–150–BS.

*Example 4.*—The same procedure as Example 1 but with the binder consisting of a quantity of 105 grams of Estane X–1 and 105 grams of Saran F–220 and the amide was caproic.

*Example 5.*—The same procedure as Example 1 but with 162 grams of Estane X–2 as the polymeric binder instead of 210 grams of Estane X–1 and the amide was 1% of palmitic.

*Example 6.*—The same procedure as Example 1 but with 150 grams of Estane X–2 as the polymeric binder instead of 210 grams Estane X–1 and the amide was 5% of lauric.

*Example 7.*—The same procedure as Example 1 but with 17 grams of Armid HT and only 4.25 grams of mineral oil.

*Example 8.*—The same procedure as Example 1 was followed except that the resin binder comprised 175 grams of ABS (Marbon Chemical Co.) rubber and 35 grams of a resin sold under the trade name VAGH, by Union Carbide and Chemicals Corporation. ABS rubber is a copolymer of acrylonitrile, butadiene and styrene. VAGH is a resin copolymer of 90% vinyl chloride with the balance being vinyl acetate which has been partly hydrolyzed.

*Example 9.*—The same procedure as Example 1 was followed except that the resin binder comprised 150 grams Hycar 1432 (B. F. Goodrich Chemical Co.) and 60 grams VAGH. Hycar 1432 is a copolymer of 20% butadiene–80% acrylonitrile.

All of the above compositions produce tapes having a long still frame life.

What is claimed is:

1. A magnetic recording medium comprising a base material suitable for a magnetic recording medium with an adherent coating thereon, said adherent coating consisting essentially of finely divided magnetic particles dispersed in a synthetic resin binder and including a lubricant consisting essentially of from 0.2 to 3% of a mineral lubricating oil and from 1 to 5% of a higher fatty acid amide, said percentages being by weight based on the resin solids and magnetic particles in the tape coating.

2. The medium of claim 1 wherein the oil is an uncompounded hydrocarbon oil having a viscosity of from 10 to 1000 cs. at 100° F.

3. The medium of claim 1 wherein the amide has from 6 to 18 carbon atoms.

References Cited

UNITED STATES PATENTS

| | | | |
|---|---|---|---|
| 1,344,645 | 6/1920 | Meyer | 117—80 |
| 2,345,632 | 4/1944 | Robinson et al. | 260—404.5 |
| 2,734,033 | 2/1956 | Menard | 252—62.54 |
| 3,017,297 | 1/1962 | Newman et al. | 117—216 |
| 3,188,226 | 6/1965 | Jense | 117—5.3 |
| 3,274,111 | 9/1966 | Sada et al. | 252—62.54 |

WILLIAM D. MARTIN, *Primary Examiner.*

W. D. HERRICK, *Assistant Examiner.*